United States Patent
Nguyen

(10) Patent No.: US 11,405,426 B2
(45) Date of Patent: Aug. 2, 2022

(54) COMPARING NETWORK SECURITY SPECIFICATIONS FOR A NETWORK TO IMPLEMENT A NETWORK SECURITY POLICY FOR THE NETWORK

(71) Applicant: salesforce.com, inc., San Francisco, CA (US)

(72) Inventor: Toan Nguyen, Toa Payoh (SG)

(73) Assignee: Salesforce.com, Inc., San Francisco, CA (US)

( * ) Notice: Subject to any disclaimer, the term of this patent is extended or adjusted under 35 U.S.C. 154(b) by 0 days.

(21) Appl. No.: 16/673,895

(22) Filed: Nov. 4, 2019

(65) Prior Publication Data
US 2021/0136118 A1  May 6, 2021

(51) Int. Cl.
*H04L 29/06* (2006.01)
*G06F 16/22* (2019.01)
(Continued)

(52) U.S. Cl.
CPC .......... *H04L 63/20* (2013.01); *G06F 16/2246* (2019.01); *H04L 12/44* (2013.01); *H04L 41/12* (2013.01); *H04L 12/46* (2013.01)

(58) Field of Classification Search
CPC .... G06F 13/00; G06F 21/604; G06F 21/6218; G06F 16/22; G06F 16/2246; H04L 12/5695; H04L 29/06; H04L 29/0809; H04L 29/06027; H04L 29/08072; H04L 29/08117; H04L 29/08144; H04L 29/08171; H04L 47/10; H04L 63/08; H04L 63/20; H04L 63/102; H04L 63/0227; H04L 67/00; H04L 12/24; H04L 12/44;
(Continued)

(56) References Cited

U.S. PATENT DOCUMENTS 6,832,313 B1   12/2004 Parker
6,996,589 B1   2/2006 Jayaram et al.
(Continued)

FOREIGN PATENT DOCUMENTS

CN   109194611 A   1/2019
WO   WO 2017/152396 A1 * 9/2017
(Continued)

OTHER PUBLICATIONS

Al-Shaer, E. S. et al., "Discovery of Policy Anomalies in Distributed Firewalls," IEEE, Mar. 2004, pp. 1-16.
(Continued)

*Primary Examiner* — Christopher A Revak
(74) *Attorney, Agent, or Firm* — Salesforce, Inc.

(57) ABSTRACT

A system compares two network security specifications expected to implement the same network security policy for a network and identifies possible discrepancies between them. The system generates a representation of relations between subnetworks of the network for each network security specification. The representation efficiently stores permitted connections between subnetworks. The system compares the representations corresponding to the two network security specifications to identify discrepancies across the two network security specifications. If discrepancies are identified across the two network security specifications the system generating a report identifying the discrepancies.

20 Claims, 7 Drawing Sheets

(51) Int. Cl.
*H04L 12/44* (2006.01)
*H04L 12/24* (2006.01)
*H04L 12/46* (2006.01)
*H04L 9/40* (2022.01)
*H04L 41/12* (2022.01)

(58) Field of Classification Search
CPC ..... H04L 12/46; H04L 41/12; H04L 63/1433; H04L 41/0893; H04L 67/141
USPC ...................... 709/225, 226, 229, 232; 726/1
See application file for complete search history.

(56) References Cited

U.S. PATENT DOCUMENTS

| | | | |
|---|---|---|---|
| 9,087,319 | B2 | 7/2015 | Nguyen |
| 10,348,767 | B1 | 7/2019 | Lee et al. |
| 10,652,283 | B1 * | 5/2020 | Harvey ................. H04L 63/20 |
| 10,812,315 | B2 | 10/2020 | Yadav et al. |
| 2004/0204949 | A1 | 10/2004 | Shaji et al. |
| 2005/0097357 | A1 | 5/2005 | Smith |
| 2005/0138413 | A1 | 6/2005 | Lippmann et al. |
| 2007/0271593 | A1 * | 11/2007 | Sugimoto ........... G06F 21/6218 726/1 |
| 2008/0091972 | A1 | 4/2008 | Tanaka et al. |
| 2010/0115101 | A1 | 5/2010 | Lain et al. |
| 2011/0231832 | A1 | 9/2011 | Dorn et al. |
| 2013/0294230 | A1 | 11/2013 | Popa et al. |
| 2014/0082196 | A1 | 3/2014 | Harrison et al. |
| 2015/0020059 | A1 | 1/2015 | Davis |
| 2015/0324215 | A1 | 11/2015 | Borthakur |
| 2015/0373054 | A1 * | 12/2015 | Chapman, II ....... H04L 63/1441 726/1 |
| 2017/0208094 | A1 | 7/2017 | Hollingshead et al. |
| 2017/0208097 | A1 | 7/2017 | Kirby et al. |
| 2017/0269957 | A1 | 9/2017 | Kamata et al. |
| 2017/0373935 | A1 | 12/2017 | Subramanian et al. |
| 2018/0139221 | A1 | 5/2018 | Chen |
| 2018/0367392 | A1 | 12/2018 | Harneja et al. |
| 2019/0191339 | A1 | 6/2019 | Li et al. |
| 2019/0297055 | A1 | 9/2019 | May et al. |
| 2020/0153740 | A1 | 5/2020 | Singh et al. |
| 2020/0213359 | A1 * | 7/2020 | Arbel ..................... H04L 63/20 |
| 2020/0235990 | A1 | 7/2020 | Janakiraman et al. |
| 2020/0259864 | A1 * | 8/2020 | Soffer ..................... H04L 41/28 |
| 2020/0272741 | A1 * | 8/2020 | Bhatia ..................... G06F 40/20 |
| 2021/0044542 | A1 | 2/2021 | Goyal |
| 2021/0075707 | A1 | 3/2021 | Kumar et al. |
| 2021/0089291 | A1 | 3/2021 | Evans et al. |
| 2021/0136118 | A1 | 5/2021 | Nguyen |
| 2021/0136119 | A1 | 5/2021 | Nguyen |

FOREIGN PATENT DOCUMENTS

WO    WO 2020/114336 A1 *   6/2020
WO    WO 2020/258991 A1 *   12/2020

OTHER PUBLICATIONS

Al-Shaer, E. S. et al., "Firewall Policy Advisor for Anomaly Discovery and Rule Editing," International Symposium on Integrated Network Management, Mar. 2003, pp. 17-30.

Gawanmeh, A. et al., "A Novel Algorithm for Detecting Conflicts in Firewall Rules," 25th IEEE Canadian Conference on Electrical and Computer Engineering (CCECE), Apr.-May 2012, pp. 1-4.

Gawanmeh, A., "Automatic Verification of Security Policies in Firewalls with Dynamic Rule Sequence," 11th International Conference on Information Technology: New Generations, Apr. 2014, pp. 279-284.

Hu, H. et al., "Detecting and Resolving Firewall Policy Anomalies," IEEE Transactions on Dependable and Secure Computing, vol. 9, No. 3, May/Jun. 2012, pp. 318-331.

Kotenko, I. et al., "Verification of Security Policy Filtering Rules by Model Checking," The 6th IEEE International Conference on Intelligent Data Acquisition and Advanced Computing Systems: Technology and Applications, Sep. 2011, pp. 706-710.

Moussa, M. et al., "A Formal Framework for verifying inter-firewalls consistency," IEEE Symposium on Computers and Communications (ISCC), Jun. 2014, pp. 1-7.

Terraform, "google_compute_firewall," Date Unknown, five pages, [Online] [Retrieved on Jan. 3, 2020] Retrieved from the Internet <URL: https://www.terraform.io/docs/providers/google/r/compute_firewall.html>.

Terraform, "Introduction to Terraform," Date Unknown, three pages, [Online] [Retrieved on Jan. 3, 2020] Retrieved from the Internet <URL: https://www.terraform.io/intro/index.html>.

Terraform, "Resource: aws_security_group_rule," Date Unknown, five pages, [Online] [Retrieved on Jan. 3, 2020] Retrieved from the Internet <URL: https://www.terraform.io/docs/providers/aws/r/security_group_rule.html>.

Yuan, L. et al., "FIREMAN: A Toolkit for FIREwall Modeling and Analysis," Proceedings of the 2006 IEEE Symposium on Security and Privacy, May 2006, pp. 1-15.

Burns, J. et al., "Automatic Management of Network Security Policy," Proceedings DARPA Information Survivability Conference and Exposition II, DISCEX'01, 2001, pp. 12-26.

United States Office Action, U.S. Appl. No. 16/675,678, dated Nov. 15, 2021, 20 pages.

* cited by examiner

COMPARING NETWORK SECURITY SPECIFICATIONS FOR A NETWORK TO IMPLEMENT A NETWORK SECURITY POLICY FOR THE NETWORK

BACKGROUND

Field of Art

This disclosure relates in general to security in computer networks and, in particular, to identifying discrepancies between network security specifications for a computer network.

Description of the Related Art

Enterprises typically use a computer network to support their information technology needs. The computer network includes multiple computers that communicate with each other using networking hardware. These computers often run services used by the enterprise, for example, databases, web servers, application servers, printer servers, logging services, and so on. Enterprises typically enforce a network security policy that specifies whether two services are permitted to interact with each other. The network security policy prevents malicious use of resources as well as accidental misuse of resources. A network security policy may be specified using a network security specification expressed in a language.

An enterprise may have two alternative network security specifications that implement the same network security policy, for example, when the enterprise migrates from one language to another or from one version of the language to another. The enterprise would like to know whether the two network security specifications actually implement the same network policy for the network. If the two network security specifications do not implement the same network policy, the enterprise identifies the discrepancies, so appropriate action may be taken. Conventional techniques determine discrepancies within the same network security specification, for example, whether the specification includes one rule that permits a connection between two services and another rule that disallows connection between the same two services. However conventional techniques do not determine discrepancies between two distinct network security specifications that are expected to implement the same underlying network security policy for a network.

Figure 1:
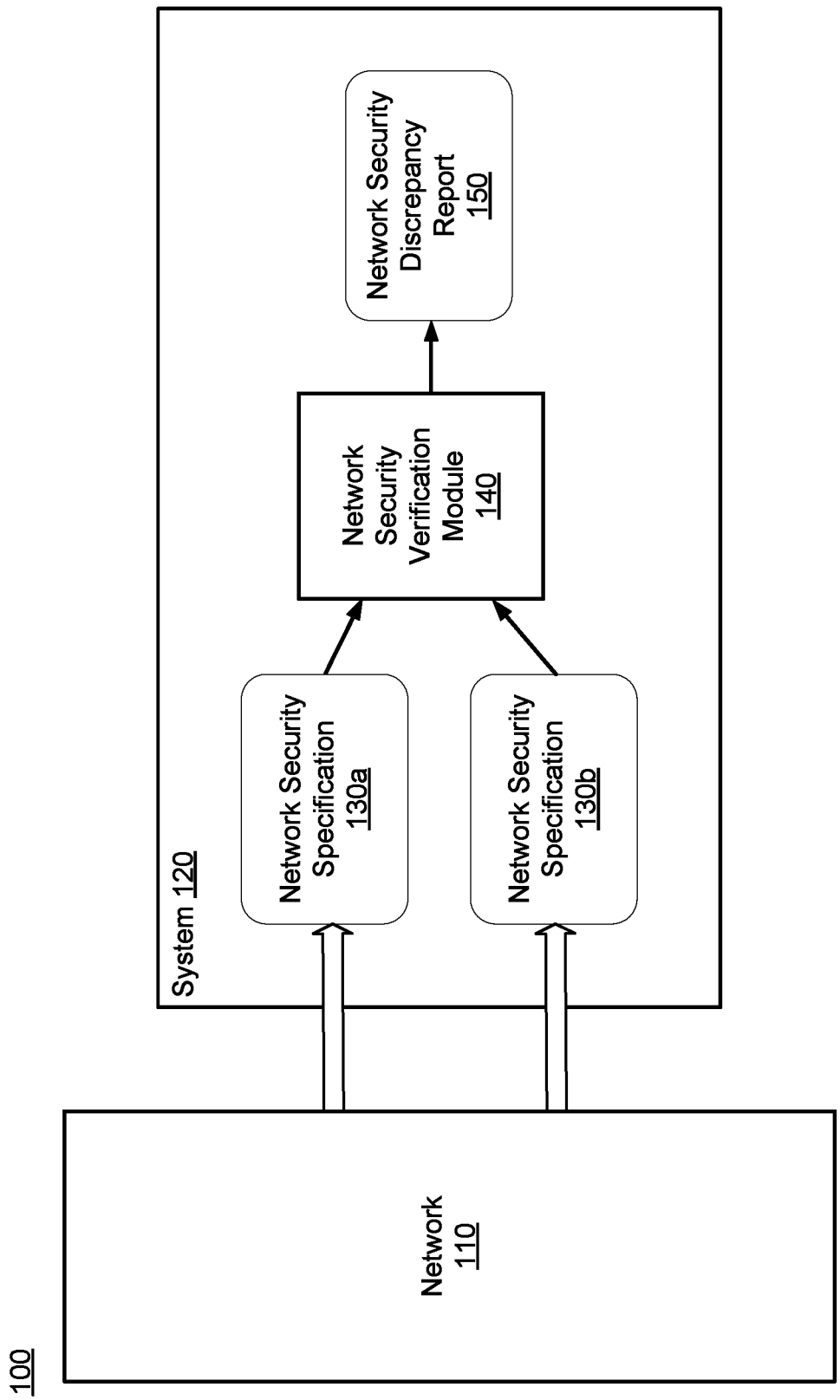
FIG. 1 is a block diagram of a system environment for identifying discrepancies between network security specifications for a network, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

DETAILED DESCRIPTION

A system receives two alternative network security specifications for implementing the same network security policy for a network. Each network security specification identifies services available in the network and defines permitted connections between services. For example, an enterprise may migrate from one language for specifying network security to another language. Accordingly, the current network security specification using one language is migrated to a new network security specification using another language. The system ensures that the network security specification for the new language implements the same network security policy for the network as the network security specification for the original language.

The system compares the two network security specifications to identify possible discrepancies between them. The system generates a representation of permitted connections between subnetworks of the network for each network security specification. A subnetwork is specified as an IP range or a set of IP addresses. The representation for a network security specification identifies subnetworks used by different services and for each subnetwork, identifies all other subnetworks that are permitted to connect with that subnetwork. The representation stores the permitted connections between subnetworks using a data structure that allows efficient comparison of the underlying network security policies. The system compares the two representations to identify discrepancies between the two network security specifications. If there are discrepancies, the system takes appropriate action, for example, generating a report describing the discrepancies or sending an alert to a user.

Overall System Environment

FIG. 1 is a block diagram of a system environment 100 for identifying discrepancies between network security specifications for a network, according to one embodiment. FIG. 1 illustrates a network 110 and a computing system 120 that receives two alternative network security specifications 130a and 130b for the network 110 and identifies discrepancies between the network security specifications. The system environment 100 may represent the information technology (IT) infrastructure of an enterprise.

The network 110 comprises computing systems and networking hardware that allows the computing systems to interact with each other. A computing system may be a server, a desktop computer, laptop, smart phone, tablet computer, or personal digital assistant (PDA). A computing system may provide services, for example, web servers, application servers, printer servers, databases, logging services, and so on. The network 110 may have multiple instances of each service. For example, there may be several databases, each installed on a different computing system. In some embodiments, multiple instances of the same service may be installed on the computing system. Services often interact with each other, for example, a web server may interact with a database, an application server may interact with a logging server, and so on.

The networking hardware provides communication pathways between various computing systems. The networking hardware includes routers, switches, and links, for example, wired links such as cable or optics or wireless links such as Wi-Fi based on radio technology. The network 110 uses a networking protocol such as the transmission control protocol/Internet protocol (TCP/IP), the user datagram protocol (UDP), internet control message protocol (ICMP), etc. The data exchanged over the network 110 can be represented using technologies and/or formats including the hypertext markup language (HTML), the extensible markup language (XML), etc.

The computing system 120 receives network security specifications 130 that implement network policies for the network 110 and processes them to identify discrepancies between the network security specifications. The computing system 120 includes a network security comparison module 140 that receives network security specifications 130a and 130b as input and processes them.

The network security specification conforms to the syntax of a network security language. There may be multiple network security languages supported by the computing system 120. Furthermore, there may be different versions of the same network security language that have variations in syntax or semantics. For example, a version of network security language may implement certain default rules that may be different from other versions. A default rule may permit connections between services based on certain predefined criteria. For example, the network security language may support grouping of services such that all services assigned to the same group may be permitted to connect to each other. Embodiments of the invention identify discrepancies between permitted connections across subnetworks of a network caused by changes in default rules, even if the network security specification itself is not changed.

Following is an example snippet of a network security specification specified using a network security language that allows users to specify services and permitted connections between services.

```
network_security_Rule Rule1 {
consumer:
    "type": "label"
    "value": "webServer"
provider:
    "type": "ipList"
    "value": "database"
connection:
    "protocol": "tcp"
    "port": "80"
}
```

The example network security specification shown above specifies a network security rule Rule1 that specifies fields including (1) a consumer, (2) a provider, and (3) a connection between the consumer and provider. Each of the consumer and provider fields have a type and a value attributes. The type field can be a label that specifies a service name or an internet protocol (IP) list representing a list of IP addresses or an IP range. If the type field is a label that specifies a service name, the specification further includes information identifying the IP list corresponding to the service name. The connection field specifies a protocol that can be used by the consumer to connect with the provider and a port number on which the consumer can connect with the provider. The rule may specify one or more connection fields allowing the consumer to connect with the provider using different networking protocols and/or networking ports.

Following is another example of a network security specification using a different network security language that allows users to specify service groups and permitted connections between service groups.

```
network_security_Rule Rule2 {
source_service_group: service1 service2 service3
destination_service_group: service4 service5
connection:
    protocol: tcp port: 80
    protocol: UDP port: 443
}
```

The example network security specification shown above specifies a network security rule Rule2 that specifies fields including (1) a source service group, (2) a destination service group, and (3) one or more connections between the source service group and the destination service group. Each of the source service group and destination service group fields specify a list of services. Although not shown in this example, the specification may further include information identifying an IP list corresponding to each service. The connection field specifies one or more protocols and corresponding port numbers that can be used by any service in the source service group to connect with a service in the destination service group.

The network security comparison module 140 generates a network security discrepancy report 150 that identifies discrepancies between the network security specifications 130a and 130b. The computing system 120 may present the network security discrepancy report 150 to a user such as a system administrator via a user interface. Alternatively, the computing system 120 may send an alert to the user identifying the discrepancies between the network security specifications 130a and 130b. Details of the computing system 120 are further described herein, for example, in FIG. 2.

System Architecture

Figure 2:
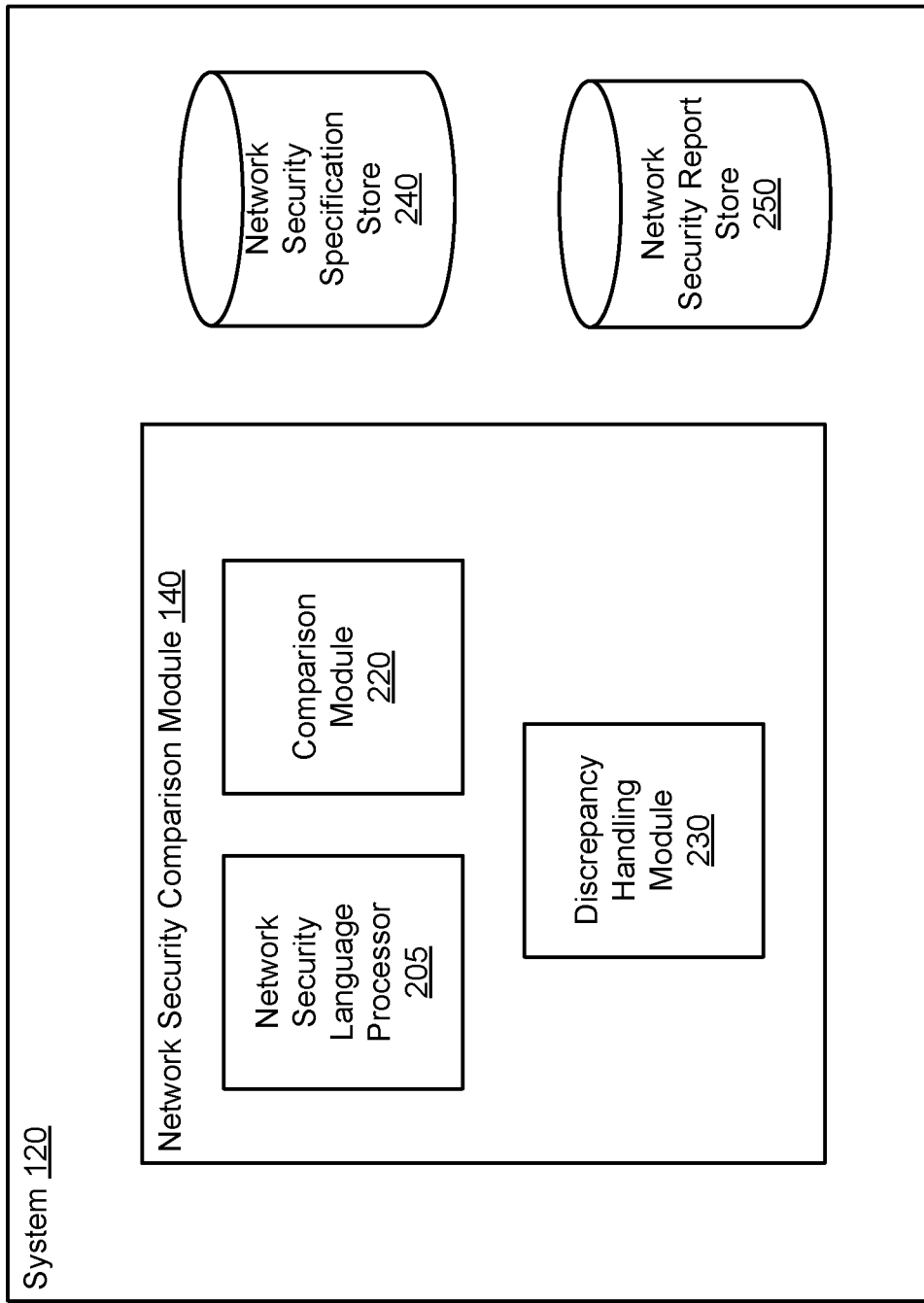
FIG. 2 is a block diagram illustrating components of a system for identifying discrepancies between network security specifications for a network, according to one embodiment.

FIG. 2 is a block diagram illustrating components of a system for identifying discrepancies between network security specifications for a network, according to one embodiment. The computing system 120 comprises a network security comparison module 140, a network security specification store 240, and a network security report store 250. Other embodiments can have different and/or other components than the ones described here, and that the functionalities can be distributed among the components in a different manner.

The network security specification store 240 stores network security specifications 130. The network security specifications may be provided by a user, for example via a user interface displayed on a client device.

The network security comparison module 140 comprises modules including a network security language processor 205, a comparison module 220, and a discrepancy handling module 230. Other embodiments may include more of fewer modules.

The network security language processor 205 parses an input network security specification according to the syntax of a network security language. The network security language processor 205 may include support for multiple network security languages.

The network security language processor 205 generates a permitted connections structure corresponding to the input network security specification. The permitted connections structure associates each subnetwork of the network with other subnetworks that are permitted to connect with the subnetwork. Examples of permitted connections structure are shown in FIG. 3.

The inputs to the network security comparison module 140 may include a source network security specification and a target network security specification, for example, if the network is migrating from the source network security specification to the target network security specification. The comparison module 220 compares permitted connections structures for the source and target network security specifications to identify discrepancies between the two network security specifications.

The discrepancy handling module 230 performs actions in response to receiving information describing discrepancies between two network security specifications. In an embodiment, the discrepancy handling module 230 generates a network security report describing the discrepancies. The discrepancy handling module 230 may store the network security report in the network security report store 250. The discrepancy handling module 230 may send an alert to a user, for example, a system administrator describing the discrepancies between two network security specifications.

In an embodiment, discrepancy handling module 230 generates one or more network security rules for adding to the target network security specification to eliminate certain discrepancies compared to the source network security specification. In some embodiments, the discrepancy handling module 230 automatically enforces one or more generated network security rules when the target network security specification is being implemented on the network. For example, a generated network security rule may block certain communications if certain discrepancies are identified between a network security specification and a previous version of the network security specification.

The network security report store 250 stores reports generated by the network security comparison module 140. The reports describe discrepancies between network security specifications. A report may identify pairs of services that are permitted to connect in one network security specification but are not permitted to connect in another network security specification.

The network security comparison module 140 is able to efficiently identify discrepancies between network security specifications using the permitted connections structure as described below.

Permitted Connections Structure

Figure 3A:
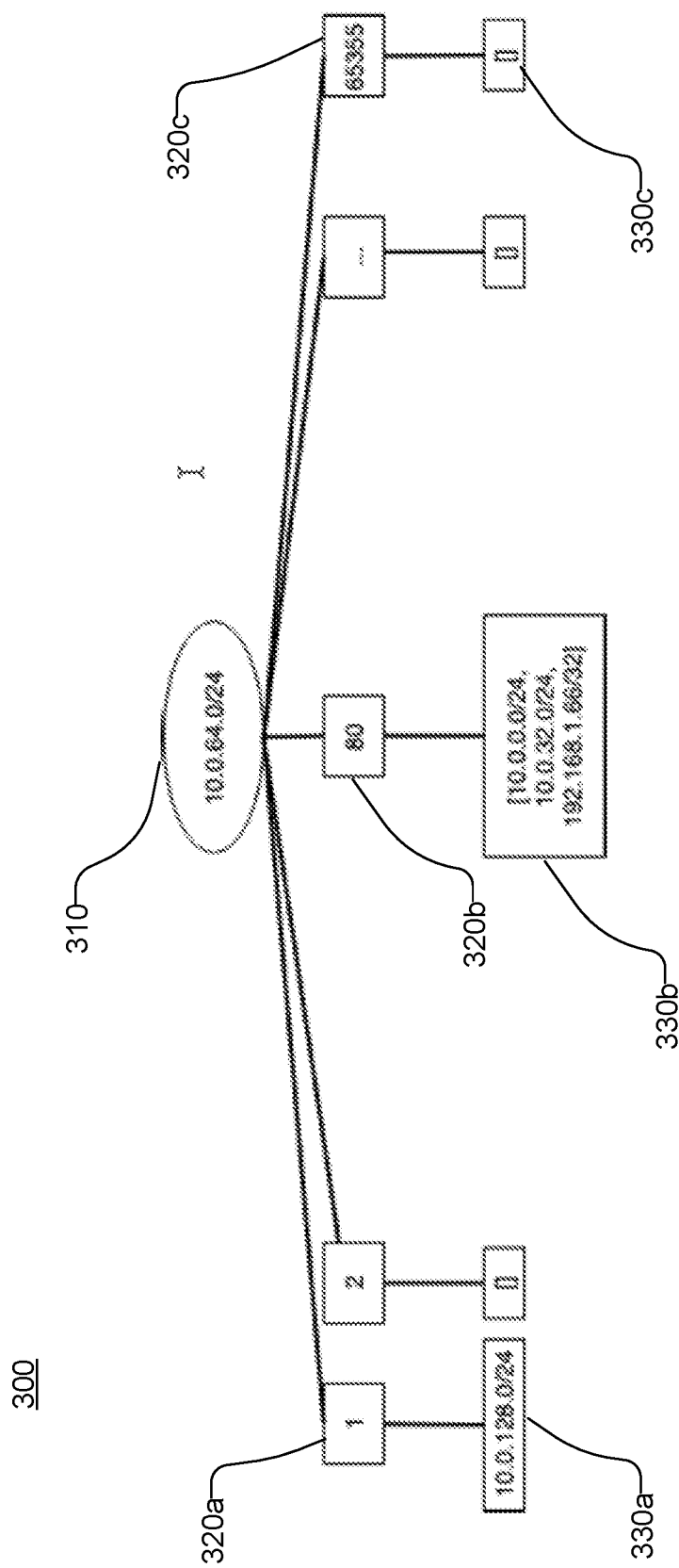
FIG. 3A illustrates a permitted connections structure according to an embodiment.

FIG. 3A illustrates a permitted connections structure according to an embodiment. The network security language processor 205 processes the network security specification and builds the permitted connections structure as it encounters information describing permitted connections between subnetworks. If the network security language processor 205 encounters a permitted connection between two services, the network security language processor 205 identifies the subnetworks corresponding to each service of the pair and adds the information to the permitted connections structure.

For each subnetwork 310 corresponding to a service with which other subnetworks can connect, the permitted connections structure comprises a tree structure 300 with subnetwork 310 at the root as illustrated in FIG. 3A. Accordingly, the permitted connections structure is a forest comprising multiple trees, each tree representing permitted connections for a subnetwork.

The tree structure 300 associates a root subnetwork 310 with leaf subnetworks 330 via ports 320. Accordingly, each leaf node represents a subnetwork 330 that is permitted to connect with the subnetwork 310 corresponding to the root node via the corresponding port 320 connecting the leaf node with the root node. If a leaf node corresponding to a port is empty, the network security specification does not allow any traffic on that port. A leaf subnetwork could represent one or more IP ranges, for example, leaf subnetwork 330*b* or it could represent an empty set, for example, leaf subnetwork 330*c*.

Figure 3B:
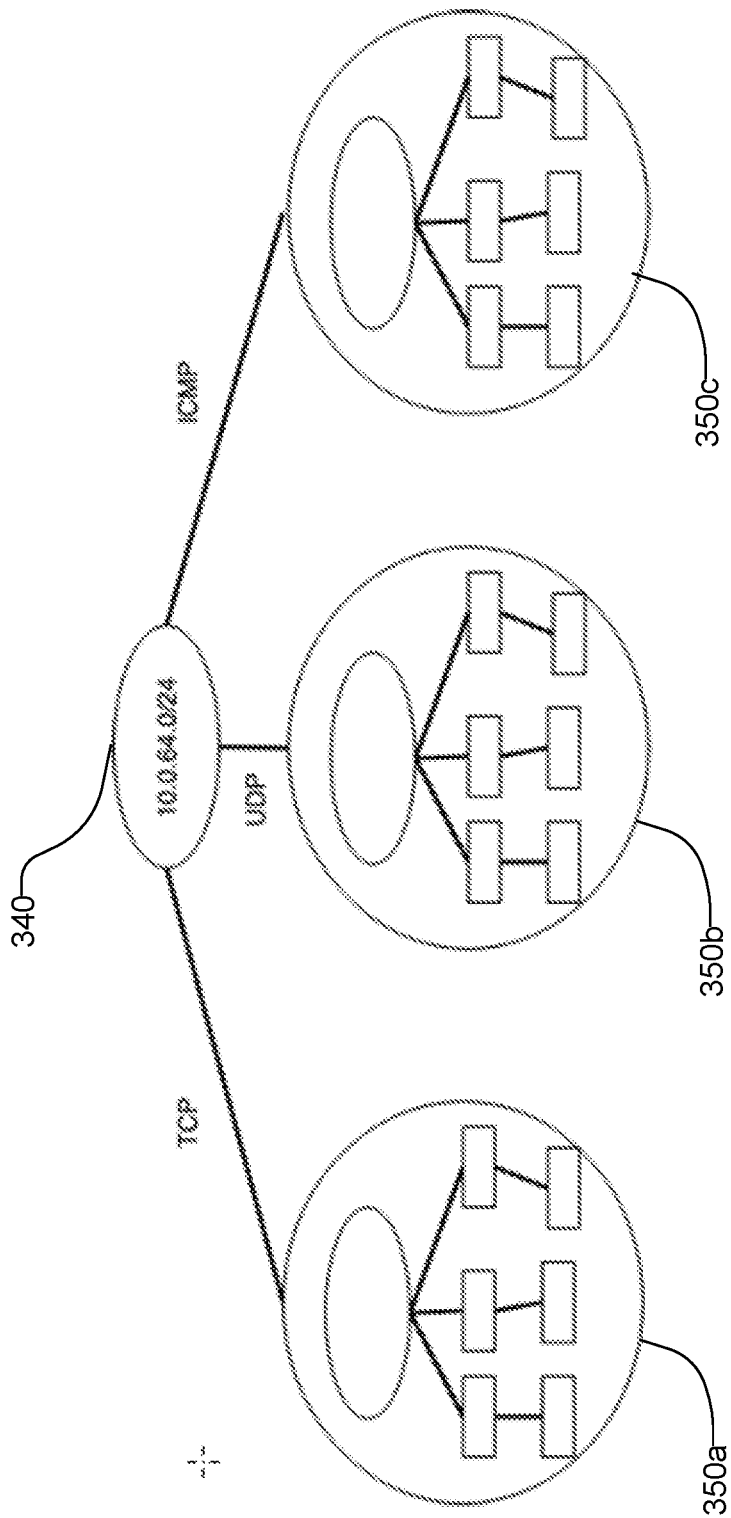
FIG. 3B illustrates a permitted connections structure according to another embodiment.

In an embodiment, the computing system 120 stores a permitted connections structure for each type of networking protocol, for example, TCP, UDP, ICMP, and so on. FIG. 3B illustrates a permitted connections structure according to another embodiment. Accordingly, the root subnetwork 340 is associated with multiple permitted connections structures 350, one for each networking protocol, for example, permitted connections structures 350*a* for TCP networking protocol, permitted connections structures 350*b* for UDP networking protocol, and permitted connections structures 350*c* for ICMP networking protocol.

In another embodiment, the networking protocol is associated with a port node. For example, there may be multiple port nodes for port 80, one for each networking protocol. Other embodiments may use other types of data structures for representing the relations between subnetworks instead of the tree structures illustrated in FIG. 3. For example, the relations between subnetworks may be represented using a table structure, for example, as a database table that comprises three columns: one for a root subnetwork, one for a port, and one for a leaf subnetwork.

In an embodiment, the network security comparison module 140 represents the tree structure illustrated in FIG. 3A using a language, for example, as follows.

```
root: 10.0.64.0/24
    protocol: "tcp"
    all_ports: [10.0.96.0/24]
    branches:
        1: [10.0.128.0/24]
        2: [ ]
        ...
        80: [10.0.0.0/24, 10.0.32.0/24, 192.168.1.66/32]
        ...
        65355: [ ]
```

The tree structure may be represented using any language that allows representation of nested objects, for example, extensible markup language (XML), or JAVASCRIPT OBJECT NOTATION (JSON).

Overall Process

Figure 4:
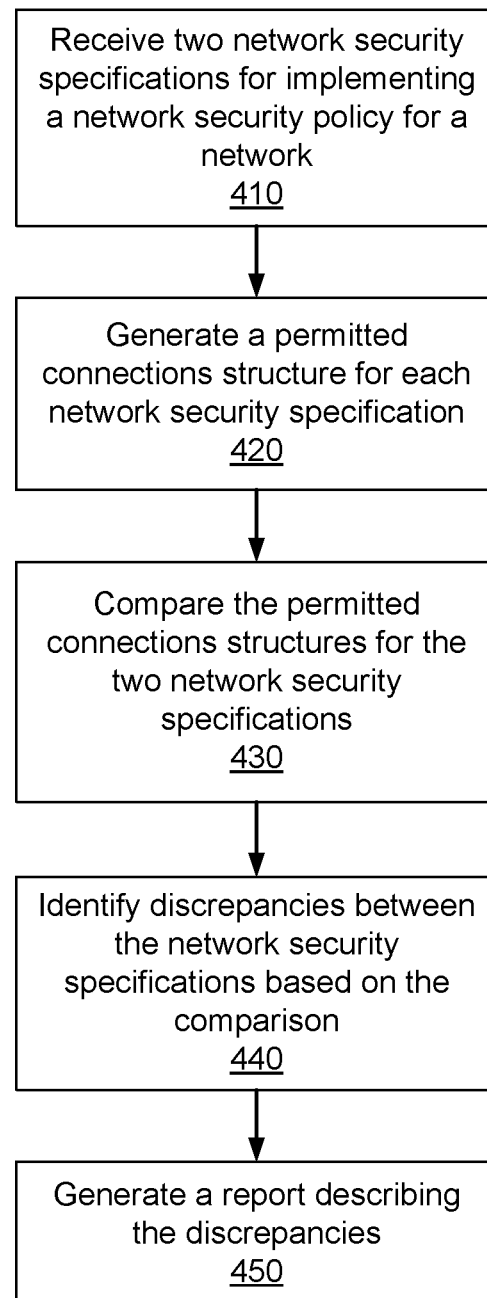
FIG. 4 is a flow chart illustrating the process for identifying discrepancies between network security specifications for a network according to one embodiment.

FIG. 4 is a flow chart illustrating the process for identifying discrepancies between network security specifications for a network according to one embodiment. Other embodiments can perform the steps of FIG. 4 in different orders. Moreover, other embodiments can include different and/or additional steps than the ones described herein. Although the process illustrated in FIG. 4 illustrates comparison of two network security specifications, the techniques disclosed are applicable to any number of network security specifications that may be two or more. For example, for any set of network security specifications that has more than two network security specifications, the process can be repeated over every possible pair of two network security specifications.

The network security comparison module 140 receives 410 two network security specifications. Both network security specifications are for implementing the same network security policy for a network. The two network security specifications may be specified using two different network security languages. Each network security specification identifies services available in the network and defines permitted connections between the services. Each service is associated with a subnetwork of the network.

The network security language processor 205 parses the network security specification and generates 420 a representation that identifies subnetworks that are permitted to connect with a given subnetwork according to a network security specification, for example, the permitted connections structure 300. The network security language processor 205 generates permitted connections structures S1 and S2 corresponding to the network security specifications.

The comparison module 220 compares 430 the permitted connections structures 300 for the two network security specifications. The comparison module 220 may compare 430 the permitted connections structures 300 by matching corresponding pairs of subnetworks that are permitted to connect. The details of the comparison are described in connection with FIG. 5.

The comparison module 220 may identify 440 discrepancies based on the matching. Each discrepancy indicates a pair of subnetworks that is permitted to connect in one representation and not permitted to connect in the other representation. The discrepancy handling module 230 generates 450 a report describing the discrepancies. The network security comparison module 140 may send the report to a user in a message or may present the report via a user interface.

Figure 5:
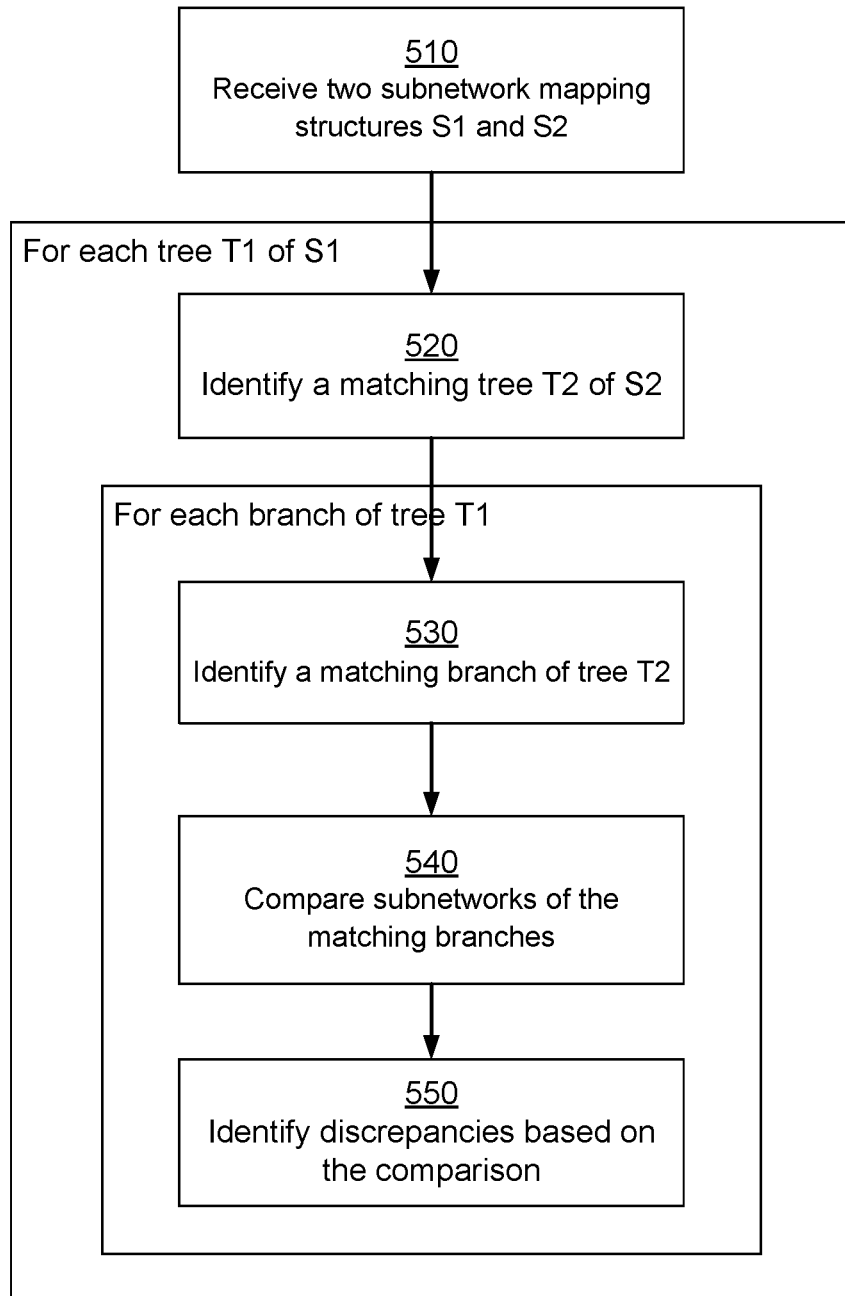
FIG. 5 is a flow chart illustrating the process for comparing permitted connections structures according to one embodiment.

FIG. 5 is a flow chart illustrating the process for comparing permitted connections structures according to one embodiment. Other embodiments can perform the steps of FIG. 5 in different orders. Moreover, other embodiments can include different and/or additional steps than the ones described herein.

The comparison module 220 receives 510 two permitted connections structures S1 and S2 and performs their comparison. For each tree T1 of the structure S1, the comparison module 220 identifies 520 a corresponding tree T2 of structure S2 such that the two trees T1 and T2 have matching subnetworks at the root node.

To identify corresponding trees in two permitted connections structures S1 and S2, the comparison module 220 compares the subnetworks of the root nodes of the trees from the two structures. Tree T1 matches tree T2 if the subnetworks of their root nodes are identical, for example, if both subnetworks represent the same IP range. The tree T1 may also match tree T2 if the subnetwork of the root node of T2 is a superset of the subnetwork of the root of T1. A subnetwork representing an IP range I1 is a superset of another subnetwork representing IP range I2 if I2 is a subrange of I1.

If there is no tree T2 corresponding to tree T1 such their corresponding root nodes have subnetworks that have exact match or subset relationship, the comparison module 220 identifies a tree T2 such that the root nodes of T1 and T2 have overlapping subnetworks. The system identifies any permitted connections of the non-overlapping parts of the two subnetworks as discrepancies. If the comparison module 220 cannot identify any tree T2 corresponding to tree T1 such that the subnetworks of their root nodes have overlapping subnetworks, the comparison module identifies permitted connections associated with trees T1 and T2 as discrepancies.

Once the comparison module 220 identifies corresponding trees T1 and T2, the comparison module 220 iterates through the branches of the tree T1. For each branch of the tree T1 having a leaf node L1, the comparison module 220 identifies the corresponding branch of tree T2 with leaf node L2. The corresponding branches have matching port numbers, i.e., the leaf nodes L1 and L2 are linked to their corresponding root nodes via the same port.

The comparison module 220 compares 540 the corresponding branches. If for a pair of matching branches, the subnetwork N1 of leaf node L1 does not match the corresponding subnetwork N2 of leaf node L2, the system identifies 550 a discrepancy describing the differences in the subnetworks N1 and N2.

The comparison module 220 considers containment of subnetworks when comparing leaf nodes of trees T1 and T2. Accordingly, if permitted connections structure S1 is being compared against permitted connections structure S2, the comparison module 220 determines whether all IP ranges of a leaf node of tree T1 are same or subsets of the IP ranges of the corresponding leaf node of tree T2 with matching port number. If an IP range of a leaf node of tree T1 is neither same nor a subset of an IP range of the corresponding leaf node of tree T2, the comparison module 220 reports the IP range as a discrepancy. The comparison of permitted connections structure S1 against permitted connections structure S2 may return different discrepancies compared to the comparison of permitted connections structure S2 against permitted connections structure S1.

In an embodiment, the comparison module 220 first compares the permitted connections structure S1 against the permitted connections structure S2 to identify the discrepancies and then compares the permitted connections structure S2 against the permitted connections structure S1 to identify any additional discrepancies. For example, if each branch of the permitted connections structure corresponds to a port, the process of comparison of connections structure S1 against the permitted connections structure S2 may only iterate over all ports in structure S1 that have a permitted connection but may not identify ports that have permitted connections in structure S2 but not in S1. To identify permitted connections that may be present at a port in in structure S2 but not in structure S1, the comparison module 220 compares the structure S2 against the structure S1 and iterates over all ports that have a permitted connection in S2.

Optimizations

There may be as many leaf nodes as the number of allowed ports, for example 65,535. In some embodiments, the tree structure 300 includes a special port node that represents "all ports" for associating leaf subnetworks 330 that can connect to the root subnetwork 310 via any possible port. This allows such subnetworks to be represented efficiently by connecting them to one port rather than repeating the subnetwork for every port. If the permitted connections structures store a separate branch for representing "all ports", the system also compares the subnetworks of the leaf nodes of that branch to identify any discrepancies.

In an embodiment, the network security language processor 205 merges subnetworks in the leaf nodes to generate an efficient representation. The leaf node may store a set of IP ranges. The network security language processor 205 receives an IP range for adding to a leaf node and determines whether the IP range already exists in the leaf node or if the IP range is a sub-range of an existing IP range of the leaf node. If the IP range already exists in the leaf node or is a subset of an existing IP range of the leaf node, the network security language processor 205 skips the received IP range. The network security language processor 205 determines whether the IP range is a superset of an existing IP range of the leaf node. If the IP range is a superset of an existing IP range of the leaf node, the network security language processor 205 replaces the existing IP range with the received IP range. This process is repeated for all IP ranges that need to be added to a leaf node.

In an embodiment, after the permitted connections structure is built, the network security language processor 205 analyzes the branches of each tree to identify leaf nodes with matching IP ranges. If network security language processor 205 identifies a leaf node with two identical IP ranges, the network security language processor 205 eliminates one of the IP ranges. If the network security language processor 205 identifies two IP ranges R1 and R2 such that R1 is a subset of R2, the network security language processor 205 eliminates the subset IP range R1 and keeps R2.

Computer Architecture

Figure 6:
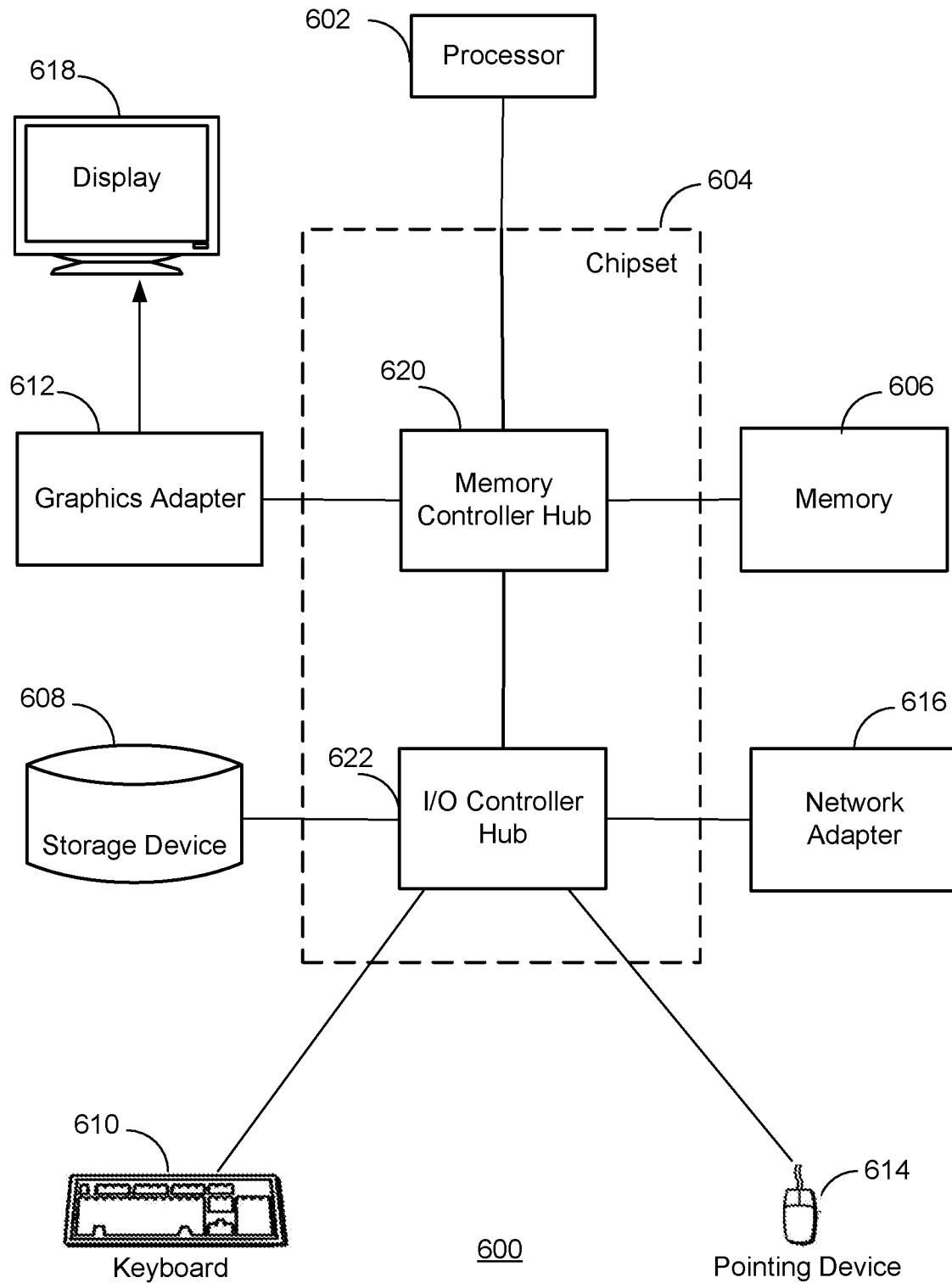
FIG. 6 is a block diagram illustrating a functional view of a typical computer system according to one embodiment.

FIG. 6 is a high-level block diagram illustrating a functional view of a typical computer system for use as one of the entities illustrated in the environment 100 of FIG. 1 according to an embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 200. The graphics adapter 612 displays images and other information on the display 618. The network adapter 616 couples the computer system 600 to the network 106.

As is known in the art, a computer 600 can have different and/or other components than those shown in FIG. 6. In addition, the computer 600 can lack certain illustrated components. For example, a computer system 600 acting as an online system 102 may lack a keyboard 610 and a pointing device 614. Moreover, the storage device 608 can be local and/or remote from the computer 600 (such as embodied within a storage area network (SAN)).

The computer 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the entities of FIG. 1 can vary depending upon the embodiment and the processing power used by the entity. For example, a client device 104 may be a mobile phone with limited processing power, a small display 618, and may lack a pointing device 614. The online system 102, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

I claim:

1. A computer-implemented method for identifying discrepancies between two alternative network security specifications used to implement a same network security policy for a network, the method comprising:

receiving a first network security specification and a second network security specification, wherein the first network security specification and the second network security specification implement a same network security policy for the network, wherein a network security specification identifies services available in the network and defines defining permitted connections between the services;

generating a first representation for the first network security specification and a second representation for the second network security specification, wherein a representation for a particular network security specification identifies a set of subnetworks that are permitted to connect with a subnetwork of the network according to the particular network security specification;

comparing the first representation and the second representation by matching connectivity of corresponding pairs of subnetworks according to the first representation and the second representation, wherein the connectivity according to a particular representation indicates whether a particular pair of subnetworks is permitted to connect according to the particular representation;

identifying one or more discrepancies based on the matching, wherein a discrepancy indicates that a connectivity of a pair of subnetworks according to the first representation is different from a connectivity of a corresponding pair of subnetwork according to the second representation; and generating a report describing the one or more discrepancies.

2. The method of claim 1, wherein generating the representation for a network security specification comprises:

identifying a pair of subnetworks in the network security specification, the pair comprising a consumer subnetwork and a provider subnetwork such that the consumer subnetwork is permitted to connect to the provider subnetwork; and adding the consumer subnetwork to the set of subnetworks that are permitted to connect to the provider subnetwork.

3. The method of claim 2, wherein adding the consumer subnetwork to the set of subnetworks that are permitted to connect to the provider subnetwork is responsive to determining that the set of subnetworks does not already include a subnetwork that is either same as the consumer subnetwork or a superset of the consumer subnetwork.

4. The method of claim 2, wherein adding the consumer subnetwork to the set of subnetworks that are permitted to connect to the provider subnetwork comprises:

responsive to determining that the consumer subnetwork is a superset of an existing subnetwork of the set, replacing the existing subnetwork by the consumer subnetwork.

5. The method of claim 1, wherein the representation comprises:

for a subnetwork, a tree data structure having a root node representing that subnetwork and a plurality of leaf nodes, wherein a leaf node represents a leaf subnetwork, wherein the leaf subnetwork is permitted to connect to the root subnetwork.

6. The method of claim 5, wherein a leaf node is associated with a port, wherein the leaf subnetwork is permitted to connect to the root subnetwork at the port.

7. The method of claim 1, wherein the first network security specification and the second network security specification are expressed using different languages.

8. The method of claim 1, wherein the first network security specification and the second network security specification are expressed using different models for describing groupings of services.

9. The method of claim 1, wherein the representation of a network security specification specifies a port number for a first subnetwork of the set of subnetworks permitted to connect with the subnetwork, wherein the port number is for use by the first subnetwork for establishing a connection with the subnetwork.

10. The method of claim 1, wherein a subnetwork is represented as one or more internet protocol (IP) ranges.

11. The method of claim 1, wherein the representation comprises:

for a subnetwork, a plurality of tree data structures, wherein a tree data structure is for a communication protocol, the tree data structure having a root node representing a root subnetwork and a plurality of leaf nodes, wherein a leaf node represents a leaf subnetwork, wherein the leaf subnetwork is permitted to connect to the root subnetwork using the communication protocol corresponding to the tree data structure.

12. A non-transitory computer readable storage medium storing instructions that when executed by a computer processor, cause the computer processor to perform steps to identify discrepancies between two alternative network security specifications used to implement a same network security policy for a network, the steps comprising:

receiving a first network security specification and a second network security specification, wherein the first network security specification and the second network security specification implement a same network security policy for the network, wherein a network security specification identifies services available in the network and defines permitted connections between the services;

generating a first representation for the first network security specification and a second representation for the second network security specification, wherein a representation for a particular network security specification identifies a set of subnetworks that are permitted to connect with a subnetwork of the network according to the particular network security specification;

comparing the first representation and the second representation by matching connectivity of corresponding pairs of subnetworks according to the first representation and the second representation, wherein the connectivity according to a particular representation indicates whether a particular pair of subnetworks is permitted to connect according to the particular representation;

identifying one or more discrepancies based on the matching, wherein a discrepancy indicates that a connectivity of a pair of subnetworks one according to the first representation is different from a connectivity of a corresponding pair of subnetwork according to the second representation; and generating a report describing the one or more discrepancies.

13. The non-transitory computer readable storage medium of claim 12, wherein the first network security specification and the second network security specification are expressed using different languages.

14. The non-transitory computer readable storage medium of claim 12, wherein the first network security specification and the second network security specification are expressed using different models for describing groupings of services.

15. The non-transitory computer readable storage medium of claim 12, wherein the representation of a network security specification specifies a port number for a first subnetwork of the set of subnetworks permitted to connect with the subnetwork, wherein the port number is for use by the first subnetwork for establishing a connection with the subnetwork.

16. The non-transitory computer readable storage medium of claim 12, wherein the representation comprises:
for a subnetwork, a tree data structure having a root node representing a root subnetwork and a plurality of leaf nodes, wherein a leaf node represents a leaf subnetwork, wherein the leaf subnetwork is permitted to connect to the root subnetwork.

17. The non-transitory computer readable storage medium of claim 12, wherein generating the representation for a network security specification comprises:
identifying a pair of subnetworks in the network security specification, the pair comprising a consumer subnetwork and a provider subnetwork such that the consumer subnetwork is permitted to connect to the provider subnetwork; and
adding the consumer subnetwork to the set of subnetworks that are permitted to connect to the provider subnetwork.

18. A computer system comprising:
a computer processor; and
a non-transitory computer readable storage medium storing instructions that when executed by the computer processor, cause the computer processor to perform steps to identify discrepancies between two alternative network security specifications used to implement a same network security policy for a network, the steps comprising:
receiving a first network security specification and a second network security specification, wherein the first network security specification and the second network security specification implement a same network security policy for the network, wherein a network security specification identifies services available in the network and defines permitted connections between the services;

generating a first representation for the first network security specification and a second representation for the second network security specification, wherein a representation for a particular network security specification identifies a set of ether subnetworks that are permitted to connect with a subnetwork of the network according to the particular network security specification;

comparing the first representation and the second representation by matching connectivity of corresponding pairs of subnetworks according to the first representation and the second representation, wherein the connectivity according to a particular representation indicates whether a particular pair of subnetworks is permitted to connect according to the particular representation;

identifying one or more discrepancies based on the matching, wherein a discrepancy indicates that a connectivity of a pair of subnetworks according to representation is different from a connectivity of a corresponding pair of subnetwork according to in the second representation; and generating a report describing the one or more discrepancies.

19. The computer system of claim 18, wherein the representation comprises:
for a subnetwork, a tree data structure having a root node representing a root subnetwork and a plurality of leaf nodes, wherein a leaf node represents a leaf subnetwork, wherein the leaf subnetwork is permitted to connect to the root subnetwork.

20. The computer system of claim 18, wherein generating the representation for a network security specification comprises:
identifying a pair of subnetworks in the network security specification, the pair comprising a consumer subnetwork and a provider subnetwork such that the consumer subnetwork is permitted to connect to the provider subnetwork; and
adding the consumer subnetwork to the set of subnetworks that are permitted to connect to the provider subnetwork.

* * * * *